(12) United States Patent
Chen

(10) Patent No.: US 6,812,957 B1
(45) Date of Patent: Nov. 2, 2004

(54) IMAGE SENSING MODULE OUTPUTTING COLOR SIGNALS OR MONOCHROME SIGNALS DEPENDING ON MODE OF OPERATION

(75) Inventor: Michael Chen, Hsinchu (TW)

(73) Assignee: Avision Inc., Hsinchu (TW)

( * ) Notice: Subject to any disclaimer, the term of this patent is extended or adjusted under 35 U.S.C. 154(b) by 836 days.

(21) Appl. No.: 09/658,930

(22) Filed: Sep. 11, 2000

(30) Foreign Application Priority Data

Sep. 17, 1999 (TW) .................................... 88116138 A

(51) Int. Cl.$^7$ ............................ H04N 3/02; H04N 1/46; H04N 5/253; H04N 9/10; G03F 3/08
(52) U.S. Cl. ........................ 348/98; 348/201; 358/505; 358/513; 358/514; 358/529
(58) Field of Search .................... 348/98, 201; 358/505, 358/513, 514, 529

(56) References Cited

U.S. PATENT DOCUMENTS

| | | | | |
|---|---|---|---|---|
| 5,166,782 A | * | 11/1992 | Asaida | 348/222.1 |
| 6,111,244 A | * | 8/2000 | Wang | 250/208.1 |
| 6,370,278 B1 | * | 4/2002 | Waguri | 382/266 |
| 6,501,865 B1 | * | 12/2002 | Tanaka et al. | 382/312 |

FOREIGN PATENT DOCUMENTS

| | | | |
|---|---|---|---|
| JP | 1241290 | 9/1989 | |
| JP | 11-220569 | * 8/1999 | .......... H04N/1/028 |

OTHER PUBLICATIONS

English translation of JP–11–220,569 Kitani.*

* cited by examiner

Primary Examiner—Wendy R. Garber
Assistant Examiner—James M. Hannett
(74) Attorney, Agent, or Firm—Rabin & Berdo, P.C.

(57) ABSTRACT

An image preprocessing apparatus, which processes image signals of an image of a scanned object, includes an image sensing module, a multiplexing unit and an analog signal processor. The image sensing module includes a number of monochrome image sensors, as well as a black-and-white (B/W) image sensor, outputting a number of monochrome analog image signals and a B/W analog image signal respectively. The multiplexing unit receives the B/W analog image signal and some of the monochrome analog image signals and then selects either the B/W analog image signal or these monochrome analog image signals as the output of the multiplexing unit. The analog signal processor receives the output of the multiplexing unit and the monochrome analog image signals that are not received by the multiplexing unit, and outputs a digital signal.

12 Claims, 3 Drawing Sheets

IMAGE SENSING MODULE OUTPUTTING COLOR SIGNALS OR MONOCHROME SIGNALS DEPENDING ON MODE OF OPERATION

BACKGROUND OF THE INVENTION

This application incorporates by reference Taiwanese application Serial No. 88116138, filed Sep. 17, 2000.

1. Field of the Invention

The invention relates in general to an image preprocessing apparatus of an image capturing apparatus, and more particularly to an image preprocessing apparatus of an image capturing apparatus which employs multiplexers to deal with analog signals obtained from black-and-white (B/W) scanning and color scanning.

2. Description of the Related Art

Referring now to FIG. 1, a conventional image capturing apparatus is shown in a block diagram form. The image capturing apparatus includes an image sensing module 10, an analog signal processor 12, and an image processing circuit 14. The image sensing module 10 scans the objects, such as documents or photos, and outputs analog signals of the resulting image. The image sensing module 10 includes three sensors for detecting color images. Outputs of the three sensors are analog signals respectively corresponding to red (R), green (G), and blue (B) component images of an image of a scanned object. Since the signal levels of these analog signals are different, these analog signals are processed and converted to digital signals by an analog signal processor 12. Finally, the output digital signals are transmitted to an image processing circuit 14 for further image processing.

The image sensing module 10 for color scanning generally fall into two categories: charge coupled device (CCD) modules and contact image sensor (CIS) modules. In the following, the CCD module is discussed first.

Since visible light is composed of three primary colors, namely, red (R), green (G) and blue (B), the color CCD module generally includes image sensors corresponding to these three colors. Referring to FIG. 2, structure of a CCD module is shown in block diagram form. The CCD module 20 includes three monochrome sensors including sensor 22, 24, and 26, which respectively detect the R, G, and B components of the light reflected by the scanned object. In general, many documents are not colored and so allowances for B/W scanning must also be provided for in the CCD module. Currently, there are three techniques for B/W scanning. The first technique involves using one of the monochrome sensors 22, 24, or 26, originally employed in a CCD module, as the sensor for B/W scanning. Sensor 24 for detecting the green component (G-sensor) is generally taken for B/W scanning. However, there is a drawback in practice. When the G-sensor 24 is used for B/W scanning, the complementary color of green will be filtered out (i.e. red will vanish) resulting in a distortion of the scanned image. The second technique involves photosensitizing the three monochrome sensors 22, 24, and 26 simultaneously and then combining the output R, G, and B component image signals by image processing circuits or software computation to produce B/W images. The disadvantage of this technique is that the processing rate is lowered. The third technique involves providing an additional B/W CCD image sensor 28 in the CCD module 20, as shown in FIG. 2.

Currently there are two structurally differentiated CCD image sensors. Referring now to FIG. 3, the structural diagram of a monochrome CCD image sensor with one shift register, which is called a single monochrome CCD image sensor, is shown. The single monochrome CCD image sensor 30 consists of a shift register 32, which is a CCD, as well as a photosensitive device 34. The shift register 32 is so named because during a clock cycle, it is capable of shifting the image data of a pixel to the next stage of the register in one direction only.

Another structure of a monochrome CCD image sensor is one having two shift registers and thus appropriately called a dual monochrome CCD image sensor. As shown in FIG. 4, because the dual monochrome CCD image sensor 40 has dual shift registers to process the image data, the data transfer rate of this sensor 40 is double that of the sensor 30 assuming that these shift registers are operating at the same clock frequency. In addition, the dual monochrome CCD image sensor 40 provides two outputs of image data, namely, the odd pixel output and even pixel output. For the single monochrome CCD image sensor 30 only one output of image data is provided.

As discussed above, in the implementation of the third technique, a B/W CCD image sensor is included in the image sensing module. Thus, an additional circuit for processing the analog output from the B/W CCD image sensor is generally required. This also leads to an additional analog signal path. Since analog signals are not as capable of bearing the effect of crosstalk as digital signals, the crosstalk due to this analog signal path would cause degradation of signal quality.

SUMMARY OF THE INVENTION

The primary objective of the invention is to provide an image preprocessing apparatus using multiplexers to process analog signals obtained from B/W and color scanning. By the invention, the analog signals obtained from B/W and color scanning are processed by the same analog signal processor, resulting in a simplification of circuit design, decreased production costs, as well as decreased crosstalk effects.

In accordance with the objective of the invention, an image preprocessing apparatus, which processes image signals of an image of a scanned object, includes an image sensing module, a multiplexer, and an analog signal processor. The image sensing module includes a number of monochrome image sensors and a B/W image sensor, all of which output analog signals. The monochrome sensors include individual sensors for detecting red, green, and blue, which output analog signals of red, green, and blue component images of the image of the scanned object respectively. The multiplexer is for receiving the B/W analog signal and some monochrome analog signals and for selecting either the B/W analog signal or these monochrome analog image signals as the output of the multiplexer. The analog signal processor is for receiving the output analog signal of the multiplexer and other monochrome analog image signals that are not received by the multiplexer, and for outputting a digital signal.

In accordance with the objective of the invention, an image sensing module includes a number of monochrome image sensors, a B/W image sensor, and a multiplexer. The monochrome image sensors are for outputting a number of monochrome analog image signals each of that corresponds to specific color. The monochrome image sensors include individual sensors for detecting red, green, and blue, and outputting analog signals of red, green, and blue respectively. The B/W image sensor is for outputting a B/W analog image signal. The multiplexer is for receiving the B/W analog signal and some monochrome analog signals and for selecting either the B/W analog signal or these monochrome analog image signals as the output of the multiplexer.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

As described above, the image preprocessing apparatus provided by the invention utilizes a multiplexer for selecting either analog signal of one of the color image sensors or analog signal of the B/W image sensor as the output signal of the multiplexer. This results in avoiding crosstalk of analog signal paths and decreasing the hardware cost of an additional analog signal processor to process the output of the B/W image sensor. The following contains six examples according to the preferred embodiments.

The First Example

Figure 1:
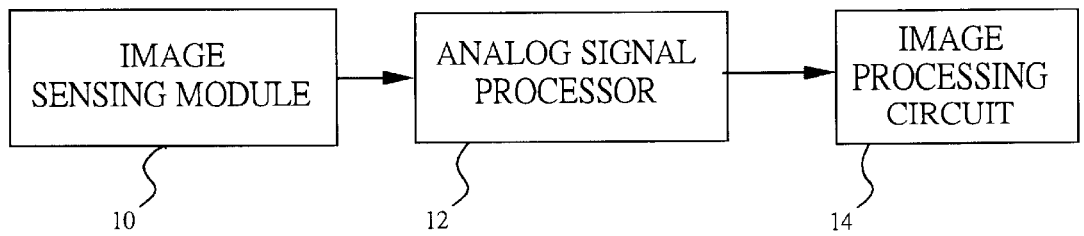
FIG. 1 is a block diagram showing the structure of a conventional image capturing apparatus.
Figure 2:
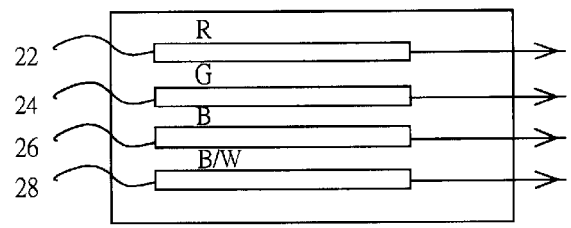
FIG. 2 is a structural diagram of a conventional CCD module.
Figure 3:
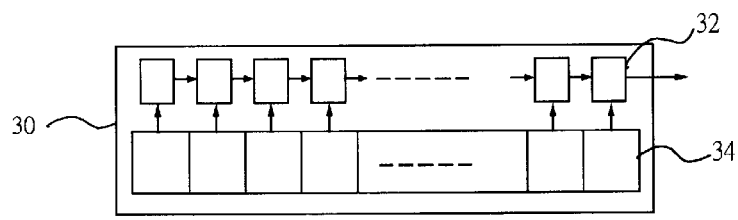
FIG. 3 is a structural diagram of a conventional single monochrome CCD image sensor.
Figure 4:
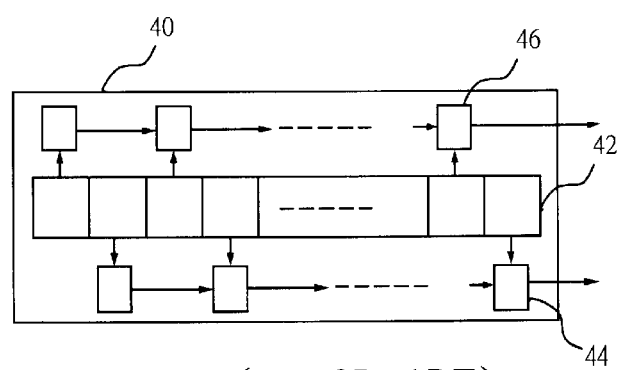
FIG. 4 is a structural diagram of a conventional dual monochrome CCD image sensor.
Figure 5:
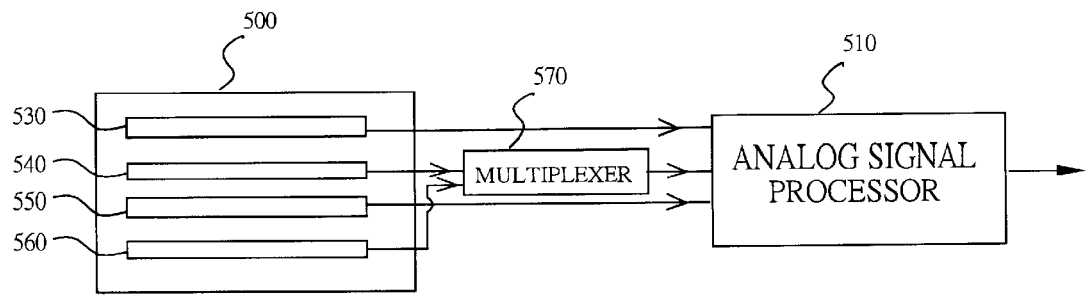
FIG. 5 shows the first example of an image preprocessing apparatus according to a preferred embodiment of the invention.

Referring now to FIG. 5, the first example of an image preprocessing apparatus according to a preferred embodiment of the invention is shown. As shown in FIG. 5, the image preprocessing apparatus includes a charge coupled device (CCD) module 500, an analog signal processor 510, and a multiplexer 570. The charge coupled device (CCD) module 500 includes three CCD image sensors, namely, a sensor 530, a sensor 540, and a sensor 550, corresponding to sensors for detecting red, green, and blue respectively, and a B/W CCD image sensor 560. The multiplexer 570 receives either one of the outputs of the sensors 530, 540, or 550 in addition to the output of the B/W CCD image sensor 560.

For instance, the multiplexer 570 receives the output of the sensor 540, for the detection of green, and the output of the B/W image sensor 560 (FIG. 5), and selects either the output of sensor 540 or the output of sensor 560 as the output of the multiplexer 570. The analog signal processor 510 processes the output of the multiplexer 570 and outputs digital signals of the image of the scanned object, thus completing the preprocessing of the captured image.

For B/W scanning using this approach, the output of the B/W scanning image sensor 560 is directed to and processed by the circuit originally intended for processing color image signals via multiplexer 570, resulting in saving hardware cost by not using dedicated circuit for processing B/W image signal.

The Second Example

Figure 6:
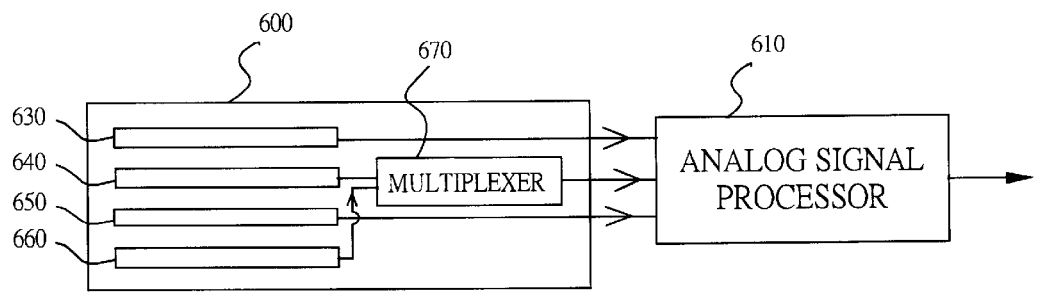
FIG. 6 shows the second example of an image preprocessing apparatus according to the preferred embodiment of the invention.

Referring to FIG. 6, the second example of an image preprocessing apparatus according to the preferred embodiment of the invention is shown. As shown in FIG. 6, a multiplexer 670 is included in a CCD module 600. In the CCD module 600, the multiplexer 670 receives either one of the outputs of the sensor 630, sensor 640, or sensor 650 as well as the output of the B/W CCD image sensor 660.

For instance, the multiplexer 670 receives the output of the sensor 640, corresponding to green, and the output of the B/W image sensor 660, and then selects either the output of the sensor 640 or the output of the sensor 660 as the output of the multiplexer 670. The analog signal processor 610 then processes the output of the multiplexer 670 and converts the processed result into digital signal as the output of the analog signal processor 610, thus completing the preprocessing of the captured image.

As illustrated in the second example, the multiplexer 670 is embedded into the CCD module 600, resulting in saving the image preprocessing apparatus an analog signal path which is necessary for B/W scanning as described in the third conventional technique mentioned above. In other words, the approach of the second example avoids the crosstalk of analog signal paths resulting from an additional analog signal path for B/W scanning sensor, which simplifies the circuit design and also reduces hardware cost.

The Third Example

Figure 7:
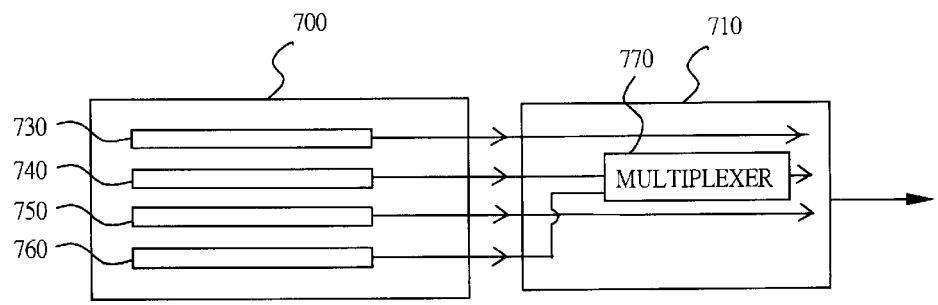
FIG. 7 shows the third example of an image preprocessing apparatus according to the preferred embodiment of the invention.

Referring to FIG. 7, the third example of an image preprocessing apparatus according to the preferred embodiment of the invention is shown. As shown in FIG. 7, a multiplexer 770 is included in the analog signal processor 710. In the analog signal processor 710, the multiplexer 770 receives either one of the outputs of the sensors 730, 740, or 750 in addition to the output of the B/W CCD image sensor 760.

For instance, the multiplexer 770 receives the output of the sensor 740 corresponding to green, and the output of the B/W image sensor 760, and then selects either the output of the sensor 740 or the output of the sensor 760 as the output of the multiplexer 770. The analog signal processor 710 processes the output of the multiplexer 770 and converts the processed analog signal into digital signal as the output of the analog signal processor 610, thus completing the preprocessing of the captured image.

For B/W scanning using this approach, the output of the B/W scanning image sensor 760 is directed to and processed in the analog signal processor 710, resulting in saving hardware cost by negating the need of using a dedicated analog signal processor for processing B/W image signal.

The Fourth Example

Figure 8:
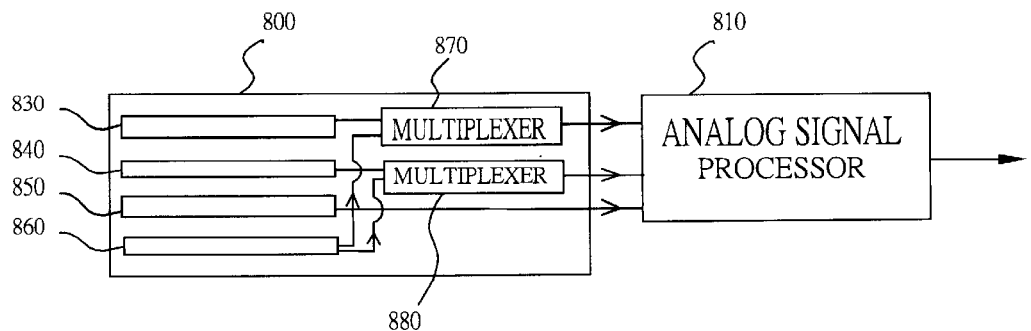
FIG. 8 is the fourth example of an image preprocessing apparatus according to the preferred embodiment of the invention.

Referring now to FIG. 8, the fourth example of an image preprocessing apparatus according to the preferred embodiment of the invention is shown. As shown in FIG. 8, the CCD module 800 utilizes the B/W CCD image sensor with two shift registers, so-called the dual B/W CCD image sensor 860, to increase the speed of B/W scanning. In this structure, one of the two output signals of the sensor 860 is respectively the input signal of two multiplexers 870 and 880. In addition, each of the multiplexers 870 and 880 receives an output signal from another single CCD image sensors for detecting red, green and blue, specifically the sensors 830, 840, and 850.

For instance, the multiplexer 870 receives the analog signal of red output by the sensor 830 as well as the analog signal of odd pixels output by the dual B/W CCD image sensor 860. On the other hand, the multiplexer 880 receives the analog signal of green output by the sensor 840 in addition to the analog signal of even pixels output by the dual B/W CCD image sensor 880. The multiplexers 870 and 880 are utilized for selecting either the analog signals that is output by the dual B/W CCD image sensor 860 for B/W scanning, or the analog signals for color scanning as the input signal of the analog signal processor 810. The analog signal processor 810 then converts the analog signal received into its corresponding digital signals, thus completing the preprocessing of the scanned image.

In this example, the aim of the dual B/W CCD image sensors is to increase the speed of B/W scanning. Generally, B/W documents are scanned more frequently than color documents. Thus, faster speed of scanning B/W documents is required. On the other hand, modern scanners are expected not to be merely peripherals of a computer system but self-contained and versatile apparatus featuring easy-to-use operations. These novel products allow the users to operate the scanners without a computer system and without knowing any complicated computer knowledge. An example would be a scanner in which the user can have a document scanned by the scanner as well as printed from a printer by pressing only one key provided by the scanner without the control of a host computer. For this kind of scanner, it is important to increase the speed of scanning, particularly the speed of B/W scanning for general usage. Thus, dual B/W CCD sensors are best suited.

The Fifth Example

Figure 9:
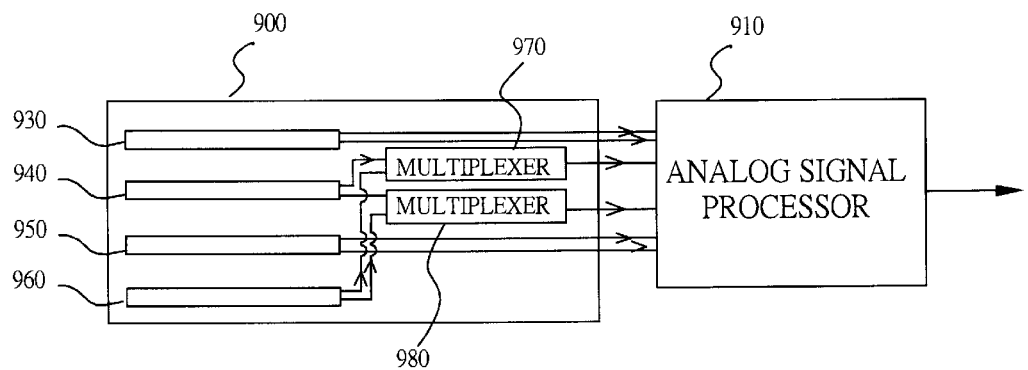
FIG. 9 shows the fifth example of an image preprocessing apparatus according to the preferred embodiment of the invention.

Referring now to FIG. 9, the fifth example of an image preprocessing apparatus according to the preferred embodiment of the invention is shown. In this example, the sensors 930, 940, 950, and 960 are dual CCD image sensors, for increasing the speed of both color scanning and monochrome scanning. In this structure, the two output signals of one of the dual color image sensors as well as the two output signals of the dual B/W image sensors are respectively the input signal of two multiplexers 970 and 980.

For instance, the multiplexer 970 receives the analog signal of odd pixels output by the sensor 940 and the analog signal for odd pixels output by the dual B/W CCD image sensor 960. The multiplexer 980 receives the analog signal of even pixels output by the sensor 940 and the analog signal of even pixels output by the dual B/W CCD image sensor 960. The multiplexers 970 and 980 are utilized for selecting either the analog signals that is output by the dual B/W CCD image sensor 960 for B/W scanning or the analog signals for color scanning as the input signal of the analog signal processor 910. The analog signal processor 910 converts the analog signal of scanned image to the corresponding digital signals, thus completing the preprocessing of the scanned image.

As illustrated in the fourth and fifth examples, a multiplexer is utilized in the CCD module for selecting analog signals of the captured images obtained from B/W scanning or color scanning. This results in negating the need of an analog signal path to the analog signal processor. In other words, the approach of these examples avoids the crosstalk of analog signal paths coming from an additional analog signal path for B/W scanning sensor as described in the third conventional technique mentioned above. In addition, this approach saves an additional analog signal processor for processing signals of B/W scanning. Thus, the approach simplifies the circuit design and reduces hardware costs.

The Sixth Example

Figure 10:
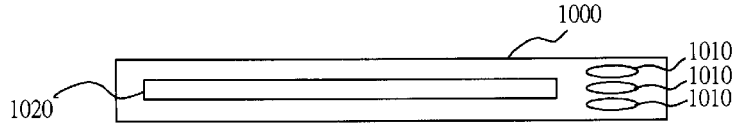
FIG. 10 is a structural diagram of the conventional light emitting diode (LED) type CIS module.

The principle of the invention is also applicable to CIS modules. Typically, there are two kinds of structure of the conventional CIS modules. Referring now to FIG. 10, in the first kind of structure, the CIS module 1000 consists of a sensor 1020 that selects for visible light and a set of three light emitting diodes (LEDs) 1010 that includes LEDs emitting red, green, and blue. Each of the three LEDs emits light sequentially. The sensor 1020 detects the light that is reflected from the scanned object and outputs the corresponding analog signal of the three colors of the image of the scanned object. Thus, the CIS module is also called an LED CIS module. For the second structure of the conventional CIS modules, referring now to FIG. 11, the CIS 1100 utilizes a cold cathode tube 1110 emitting white light and utilizes three image sensors 1120, 1130, and 1140 for detecting red, green, and blue reflected from the scanned object respectively. Additionally, the B/W image sensor 1150 is included for B/W scanning. This CIS module is also called a "cold cathode tube type" CIS module.

Figure 11:
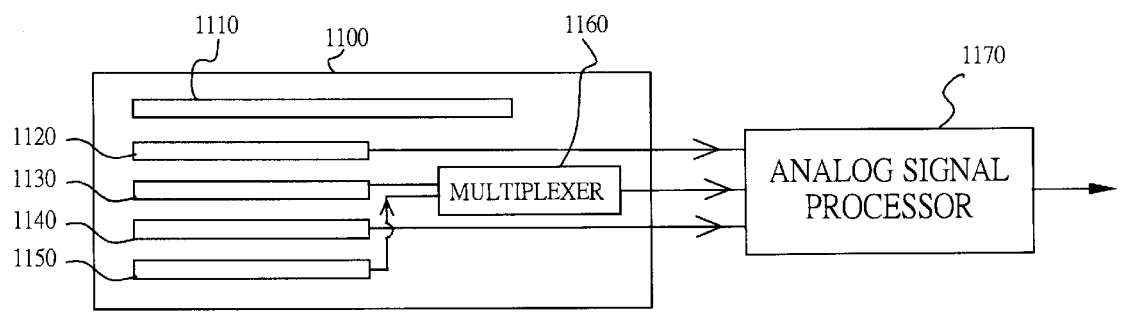
FIG. 11 shows the sixth example of an image preprocessing apparatus according to the preferred embodiment of the invention.

As shown in FIG. 11, the structure of CIS module utilizes the principle of the invention disclosed above. In the CIS module 1100, the multiplexer 1160 receives either one of the outputs of the sensors 1120, 1130, or 1140 as well as the output of the B/W CCD image sensor 1150.

For instance, the multiplexer 1160 receives the output of the sensor 1130, for detecting green color, and the output of the B/W image sensor 1150, and then selects either the output of the sensor 1130 or the output of the sensor 1150 as the output of the multiplexer 1160. The analog signal processor 1170 processes the output signal of the multiplexer 1160 and converts the processed result into digital signal as the output of the analog signal processor 1160, thus completing the preprocessing of the captured image.

The image preprocessing apparatus according to the preferred embodiment of the invention is disclosed above. The apparatus utilizes a multiplexer for selecting either the analog signal of the color image sensors or the analog signal of the B/W image sensor as the output signal of the multiplexer. In this way, it results in saving hardware cost due to adding dedicated signal processor for processing the analog signal of B/W scanning. In addition, the dedicated analog signal path of the conventional approach is no longer needed, resulting in the avoidance of crosstalk of analog signal paths and thus improving the quality of image scanning.

Although the invention has been described by way of example and in terms of a preferred embodiment, it is to be understood that the invention is not limited thereto. To the contrary, it is intended to cover various modifications and similar arrangements. The scope of the appended claims therefore should be accorded the broadest interpretation so as to encompass all such modifications and similar arrangements and procedures.

What is claimed is:

1. An image preprocessing apparatus, which processes image signals of an image of a scanned object, comprising:
    an image sensing module, comprising:
        a plurality of single monochrome image sensors for outputting a plurality of monochrome analog image signals, the single monochrome image sensors including an image sensor for detecting red, an image sensor for detecting green, and an image sensor for detecting blue, respectively for outputting analog image signals of red, green, and blue component images of the image;
    a dual black-and-white (B/W) image sensor for outputting a B/W analog image signal of the image, the B/W analog image signal comprising an odd B/W analog image signal and an even B/W analog image signal;
    a multiplexing unit receiving the B/W analog image signal and some of the monochrome analog image signals, and selectively outputting either the B/W analog image signal or said some of the monochrome analog image signals, wherein the multiplexing unit comprises:
        a first multiplexer receiving the odd B/W analog image signal and one of the monochrome analog image signals, and
        a second multiplexer receiving the even B/W analog image signal and another one of the monochrome analog image signals; and an analog signal processor receiving the output of the multiplexing unit and monochrome analog image signals not received by the multiplexing unit, and outputting a digital image signal.

2. An image preprocessing apparatus according to claim 1, wherein the multiplexing unit is in the image sensing module.

3. An image preprocessing apparatus according to claim 1, wherein the multiplexing unit is in the analog signal processor.

4. An image preprocessing apparatus according to claim 1, wherein the image sensing module is a charge coupled device (CCD) module.

5. An image preprocessing apparatus according to claim 4, wherein the dual B/W image sensor is a dual B/W CCD image sensor and all of the single monochrome image sensors are single monochrome CCD image sensors.

6. An image preprocessing apparatus according to claim 1, wherein the image sensing module is a cold cathode tube type contact image sensor (CIS) module.

7. An image preprocessing apparatus according to claim 1, wherein the image preprocessing apparatus is in a scanner.

8. An image sensing module comprising:

a plurality of single monochrome image sensors outputting a plurality of monochrome analog image signals, the single monochrome image sensors comprising an image sensor for detecting red, an image sensor for detecting green, and an image sensor for detecting blue, respectively for outputting an analog signal of red, an analog signal of green, and an analog signal of blue;

a dual black-and-white (B/W) image sensor outputting a B/W analog image signal, the B/W analog image signal comprising an odd B/W analog image signal and an even B/W analog image signal; and a multiplexing unit receiving the B/W analog image signal and some of the monochrome analog image signals, and selectively outputting either the B/W analog image signal or some of the monochrome analog image signals, wherein the multiplexing unit comprises:

a first multiplexer receiving the odd B/W analog image signal and one of the monochrome analog image signals, an a second multiplexer receiving the even B/W analog image signal and another one of the monochrome analog image signals.

9. An image sensing module according to claim 8, wherein the image sensing module is a charge coupled device (CCD) module.

10. An image sensing module according to claim 8, wherein the duel B/W image sensor is a dual B/W CCD image sensor and all of the single monochrome image sensors are single monochrome CCD image sensors.

11. An image sensing module according to claim 8, wherein the image sensing module is a cold cathode tube type contact image sensor (CIS) module.

12. An image sensing module according to claim 8, wherein the image sensing module is in a scanner.

* * * * *